(12) United States Patent
Arnhold

(10) Patent No.: US 12,009,641 B2
(45) Date of Patent: Jun. 11, 2024

(54) PRESSURE RELIEF DEVICE AND HOUSING COMPRISING SAME

(71) Applicant: R. STAHL SCHALTGERÄTE GMBH, Waldenburg (DE)

(72) Inventor: Thorsten Arnhold, Pfedelbach (DE)

(73) Assignee: R. STAHL SCHALTGERÄTE GMBH, Waldenburg (DE)

( * ) Notice: Subject to any disclaimer, the term of this patent is extended or adjusted under 35 U.S.C. 154(b) by 655 days.

(21) Appl. No.: 17/265,417

(22) PCT Filed: Jul. 23, 2019

(86) PCT No.: PCT/EP2019/069842
§ 371 (c)(1),
(2) Date: Feb. 2, 2021

(87) PCT Pub. No.: WO2020/030426
PCT Pub. Date: Feb. 13, 2020

(65) Prior Publication Data
US 2021/0313780 A1    Oct. 7, 2021

(30) Foreign Application Priority Data
Aug. 7, 2018 (DE) .................... 10 2018 119 144.8

(51) Int. Cl.
*F16K 17/40* (2006.01)
*A62C 4/00* (2006.01)
(Continued)

(52) U.S. Cl.
CPC ............. *H02B 1/28* (2013.01); *A62C 4/00* (2013.01); *F16K 13/06* (2013.01); *F16K 17/40* (2013.01);
(Continued)

(58) Field of Classification Search
CPC ......... Y10T 137/1632; Y10T 137/1692; Y10T 137/1714; F16K 13/06; H02B 1/28; H02B 13/025; A62C 4/00; H05K 5/0213
See application file for complete search history.

(56) References Cited

U.S. PATENT DOCUMENTS 2,801,768 A * 8/1957 Immel ................. H01H 9/043
  220/88.2
4,188,856 A * 2/1980 Bendler ............... F16K 13/06
  89/1.14
(Continued)

FOREIGN PATENT DOCUMENTS

CN    101493102 A    7/2009
CN    103038801 A    4/2013
(Continued)

OTHER PUBLICATIONS

Chinese Search Report for Chinese Application No. 201980051977.7 dated Apr. 28, 2022; 4 Pages.
(Continued)

*Primary Examiner* — Matthew W Jellett
(74) *Attorney, Agent, or Firm* — CANTOR COLBURN LLP

(57) ABSTRACT

A pressure relief device including a gas-permeable body to which a membrane adheres that is preferably impermeable to moisture. The membrane can be a rubber membrane that is formed by applying liquid rubber to the pressure relief body and, optionally, a component which supports the liquid rubber and surrounds the pressure relief body.

19 Claims, 3 Drawing Sheets

(51) Int. Cl.
*H02B 1/28* (2006.01)
*H05K 5/02* (2006.01)

(52) U.S. Cl.
CPC ...... *H05K 5/0213* (2013.01); *Y10T 137/1632* (2015.04); *Y10T 137/1692* (2015.04); *Y10T 137/1714* (2015.04)

(56) References Cited

U.S. PATENT DOCUMENTS

| | | | | |
|---|---|---|---|---|
| 4,484,690 | A * | 11/1984 | Nash | H05K 5/06 55/491 |
| 4,612,739 | A * | 9/1986 | Wilson | F16K 17/162 220/89.2 |
| 5,155,471 | A * | 10/1992 | Ellis | F16K 37/00 137/557 |
| 5,257,819 | A * | 11/1993 | Frantom | F42B 3/04 137/68.13 |
| 5,290,060 | A * | 3/1994 | Smith | B60R 21/261 137/68.13 |
| 5,586,783 | A * | 12/1996 | Adam | B60R 21/272 137/68.13 |
| 5,678,856 | A * | 10/1997 | Headley | B60R 21/268 137/68.13 |
| 6,068,293 | A * | 5/2000 | Shirk | B60R 21/268 280/737 |
| 6,206,420 | B1 * | 3/2001 | Skanborg | F17C 13/06 137/68.22 |
| 6,227,562 | B1 * | 5/2001 | Shirk | B60R 21/268 137/71 |
| 6,244,622 | B1 * | 6/2001 | Al-Amin | B60R 21/268 137/68.13 |
| 6,612,326 | B2 * | 9/2003 | Specht | B60R 21/268 280/736 |
| 7,444,918 | B2 * | 11/2008 | Hirooka | F42B 3/04 137/68.13 |
| 7,779,697 | B2 | 8/2010 | Nitecki | |
| 7,914,040 | B1 * | 3/2011 | Stevens | B60R 21/274 137/68.13 |
| 8,013,238 | B2 * | 9/2011 | Hockaday | H01L 31/035281 136/246 |
| 8,746,281 | B2 * | 6/2014 | Morin | B65D 77/225 220/203.11 |
| 9,066,420 | B2 | 6/2015 | Loureiro et al. | |
| 10,537,760 | B2 | 1/2020 | Barz | |
| 2009/0314356 | A1 | 12/2009 | Osumi et al. | |
| 2011/0303523 | A1 | 12/2011 | Walker et al. | |
| 2013/0206752 | A1 | 8/2013 | Wuerz et al. | |
| 2013/0206759 | A1 | 8/2013 | Wurz et al. | |
| 2015/0060465 | A1 | 3/2015 | Limbacher et al. | |
| 2016/0069474 | A1 | 3/2016 | Shaw | |
| 2017/0319881 | A1 | 11/2017 | Barz | |
| 2019/0321667 | A1 | 10/2019 | Ott et al. | |

FOREIGN PATENT DOCUMENTS

| | | |
|---|---|---|
| CN | 107073306 A | 8/2017 |
| DE | 102010016782 A1 | 11/2011 |
| DE | 102016211763 A1 | 1/2018 |
| EP | 0109804 A1 | 5/1984 |
| JP | 2017073195 A * | 4/2017 |
| JP | 2017073195 A | 4/2017 |
| RU | 2578116 C2 | 3/2016 |
| WO | 2010031336 A1 | 3/2010 |
| WO | 2016070874 A1 | 5/2016 |
| WO | 2017106204 A1 | 6/2017 |

OTHER PUBLICATIONS

Second Chinese Office Action for Chinese Application No. 201980051977.7 dated May 7, 2022; 10 Pages.
Translation of Second Chinese Office Action for Chinese Application No. 201980051977.7 dated May 7, 2022; 8 Pages.
Chinese Office Action for Chinese Application No. 201980051977.7; dated Sep. 23, 2021; 8 Pages.
English Translation of Chinese Office Action for Chinese Application No. 201980051977.7; dated Sep. 23, 2021; 9 Pages.
Russian Office Action for Application No. 2021104920/03(010812); dated Jul. 27. 2022 (No English Translation).
Russian Search Report for Application No. 2021104920; dated Jul. 27, 2022 (No English Translation).
Indian Office Action for Application No. 202137000014; dated Aug. 17, 2022; 5 Pages.
Chinese Office Action for Chinese Application No. 201980051977.7; dated Dec. 26, 2022; 6 Pages; Non-English.
English Translation for International Search Report for Application No. PCT/EP2019/069842.
German Office Action for Application No. 10 2018 119 144.8; dated Apr. 16, 2019.
International Search Report for Application No. PCT/EP2019/069842.
Written Opinion for International Search Report for Application No. PCT/EP2019/069842.

* cited by examiner

PRESSURE RELIEF DEVICE AND HOUSING COMPRISING SAME

CROSS REFERENCE TO RELATED APPLICATIONS

This application is a National Stage of PCT Application No. PCT/EP2019/069842 filed on Jul. 23, 2019, which claims priority to German Patent Application No. 10 2018 119 144.8 filed on Aug. 7, 2018, the contents each of which are incorporated herein by reference thereto.

BACKGROUND

The invention refers to a pressure relief device and a housing with such a pressure relief device. Particularly, the invention refers to an explosion-proof housing in the protection category "flameproof enclosure" that is denoted as protection category ex-d.

Housings in the configuration flameproof enclosure frequently comprise a so-called pressure relief device via which overpressure created in the housing can escape to the outside. Typically such pressure relief devices comprise a porous body that is gas-permeable, but blocks the breakthrough of flames or glowing particles due to the narrowness and length of pores extending therethrough.

A pressure relief device is known from DE 10 2010 016 782 A1 having such a porous body that comprises a first side facing the housing interior and a second side facing the environment. In addition, the pressure relief device comprises a membrane that is arranged between the environment and the second side of the pressure relief body in order to keep dust and moisture away from the pressure relief body. In doing so, it shall be avoided that the pores of the pressure relief body fill with dust, that moisture leads to degradation, growth of mold or other damages or that bio-films are formed that could affect the function or are at least unattractive. If an explosion is ignited inside the housing and if a gas flow escapes through the pressure relief body, the membrane rips and releases the path toward the environment. The membrane is provided with a cuff and held with it on a nozzle of the pressure relief device. If the membrane is destroyed, it has to be exchanged, such that the cuff has to be releasably connected with the pressure relief device. As a result also an undesired removal of the membrane of the pressure relief device can occur. In addition, the membrane may rip or may be damaged due to an influence from outside, e.g. if an object presses against the membrane.

BRIEF SUMMARY

It is the object of the invention to provide a simplified pressure relief device.

A pressure relief device, for explosion-protected housings, including: a porous gas-permeable body having a first side facing a volume during use that contains at least one potential ignition source and a second side facing away from the volume during use; and a membrane attached to the porous gas-permeable body in a manner being in abutment against the porous gas-permeable body.

A method for attaching a membrane to a porous gas-permeable body for providing a pressure relief device that has a first side facing a volume during use that contains at least one potential ignition source and a second side facing away from the volume during use; and a membrane attached to the porous gas-permeable body in a manner being in abutment against the porous gas-permeable body, wherein the porous gas-permeable body is attached to a component supporting the porous gas-permeable body such that the second side of the porous gas-permeable body faces an environment; the method including the steps of: spraying of a non-cured membrane material on the second side of the porous gas-permeable body; and curing the membrane material for creating the membrane.

The pressure relief device according to the invention comprises a porous, gas-permeable body that is arranged at a gas exit location via which gas may enter the atmosphere or a reception volume from a volume that, for example, expands due to an explosion. On a side of the porous, gas-permeable body that is downstream in flow direction and that is facing the environment or the reception volume, a membrane is attached that abuts against the porous body. The membrane covers the pores of the gas-permeable body, such that pollution and moisture from outside is kept away from the porous body. Due to the abutment of the membrane against the porous body, it supports the membrane such that the membrane is protected against impact and similar stresses coming from outside.

Preferably the membrane is attached on the porous body in a sticking manner, wherein preferably the sticking effect is so strong that the membrane is not released from the porous body during differential pressures that occur during the proper operation. In doing so, it is ensured that the protection of the membrane provided by the support on the porous body is maintained permanently.

The membrane can preferably stick to the porous body at least partly and at least so strong that it does not get lost or does not release from the porous body during the scheduled operation duration of the pressure relief device. The sticking effect is, however, preferably so low that it releases from the porous body, if a pressure difference is present there that exceeds negligible pressure differences provided during the normal operation. During the normal operation low pressure differences can be created, if in a housing on which the pressure relief device is mounted, heating or cooling occurs due to operation.

A pressure difference resulting in detachment of the membrane from the porous body is preferably, however, less than the pressure difference that results in damage, deformation or rupture of the housing. For example, the pressure difference can be less than 5 bar, 3 bar, 1 bar, some 100 mbar or also less than 100 mbar. The sticking effect of the membrane on the porous body can be based on adhesion and/or on a form-fit interlocking of the membrane with the surface roughness or with pores of the porous body.

Preferably the bond strength of the membrane on the porous body is less than the tear strength of the membrane. In doing so, due to a gas flow passing through the porous body, a large two-dimensional detachment of the membrane from the porous body can be achieved such that the membrane is blown away as a hole in the event of an explosion and releases the complete cross-section of the porous body for the gas flow.

Preferably the membrane is a moisture-impermeable foil that is deductably attached in a sticking manner to the porous body. The membrane can be produced on the porous body by primary forming. However, it can also be provided in pre-manufactured form, e.g. as tailored foil and can be connected in a sticking manner with the porous body and if applicable, a component connected therewith. For this the foil can be provided with an adhesive on the side facing the porous body. The foil can also be a flexible self-adhesive foil. Thereby the porous body is preferably planar or only curved in one direction, e.g. cylindrically curved. It can also comprise multiple edges that are parallel with regard to one another. The foil can also be a shrink foil. In this case it is particularly suitable for attachment on a porous body that is three-dimensionally configured, e.g. spherically curved.

In general all elastomers and polymers or other plastics, as well as mixtures thereof that can be applied on the porous body in not or not completely cured condition and thus in pulpy or liquid pre-condition without the non-cured material entering the pores of the porous body in a blocking manner, are suitable as foil material. To ensure this the porous body can be provided with a moisture-inhibiting substance prior to the application of the membrane, e.g. in that a release agent, for example oil, an oil suspension, silicone, a silicone suspension or the like is sprayed or otherwise applied on the surface of the porous body to be coated, prior to spraying on the membrane.

After the application of the membrane material on the porous body and, if applicable, areas of a component supporting or surrounding it, the membrane material is dried. The drying can be carried out by venting of volatile solvents and/or interlinking and thus curing of precursor material. The interlinking can be initiated automatically due to laps of time or due to influences that effectuate the interlinking accordingly. Such influences can be the exposure of membrane material to air, moisture, heat, radiation, light or the influence of chemical substances that are contained in the membrane material or that are applied on the membrane.

The membrane can be configured with a single or with multiple layers. In the simplest case the membrane is a rubber or elastomer membrane sprayed on the porous body and consisting of a material that is commercially in use as spray foil, e.g. in the field of motor vehicle bodies. Such material is sprayed on the porous body from outside and "dried", whereby the desired membrane is formed from the sprayed on material.

The membrane can be configured with a single layer or with multiple layers. For example, a foil can be part of the membrane that abuts against the porous body partly or completely two-dimensionally. For example, during the creation of the membrane this foil is placed on the porous body and this arrangement is then oversprayed with the still liquid membrane material.

The foil can be a piece of paper, a plastic foil, a metal foil, a woven fabric, a plastic-metal-compound material or another flexible two-dimensional structure. This arrangement simplifies the detachment of the membrane from the porous body and allows the application of the inventive concept, if already particularly small pressure differences shall result in the release of the membrane or if particularly low diffusion permeabilities are desired.

The inventive concept can be applied practically on arbitrary-shaped pressure relief bodies. They can be configured as three-dimensional bodies, e.g. cylinders, spheres, pyramids, polyhedrons or, if required, also as planar bodies. In doing so, the inventive concept opens up a wide field of applications that could not be solved yet economically and constructively.

The membrane can extend in sections over a component supporting the body and can also be attached thereon in a sticking manner. Such a component can be, for example, a housing wall on which the porous body is attached. Also particularly large pressure relief bodies that are arranged behind a flow separating grid with view from the outside can be provided with a membrane by spraying on membrane material.

The membrane can contain functional elements that monitor, e.g. the membrane integrity or other conditions. This can be done, for example, in that conductor paths, temperature sensors, pressure sensors or the like are inserted in the membrane. For example, a multi-layer configuration of the membrane can serve for this purpose, e.g. in that first a first layer of curable material is sprayed on the porous body, then functional elements are attached and then another layer of curing and/or drying material is sprayed on. Such multi-layer structures can be used for the purpose to determine the detachment and rupture of a membrane and to generate a signal therefrom that is to be transmitted to a central monitoring unit, for example.

BRIEF DESCRIPTION OF THE DRAWINGS

Additional modifications of the invention are possible. Embodiments of the invention are derived from the drawings, claims and the description. The drawings show:

DETAILED DESCRIPTION

Figure 1:
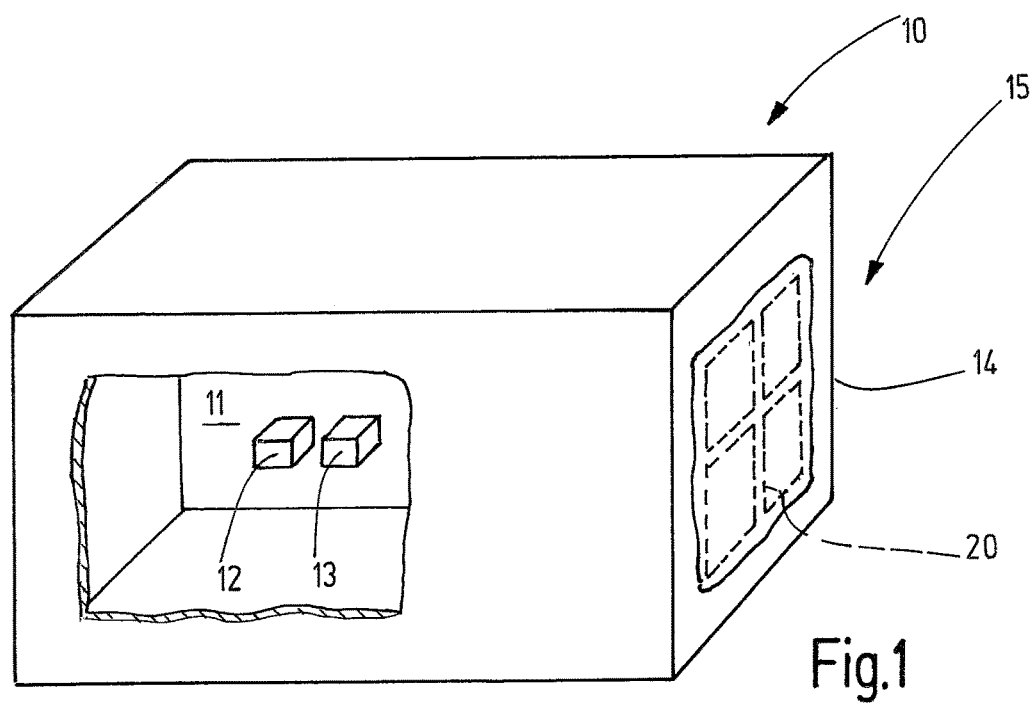
FIG. 1 a housing with an inventive pressure relief device in a schematic perspective illustration, FIG. 2 the pressure relief device of the housing according to FIG. 1 in a vertical section, FIG. 3 a part of the pressure relief device according to FIG. 2, FIG. 4 a modified embodiment of a pressure relief device on a housing in a vertical section, FIG. 5 a modified embodiment of a pressure relief body having a membrane and an additional functional element, FIG. 6 the inventive pressure relief device in a partly highly enlarged illustration, FIG. 7 a modified embodiment of the pressure relief device in a sectional illustration similar to FIG. 6.

In FIG. 1 a housing 10 is perspectively illustrated in partly cut form that encloses an interior 11 in which components 12, 13 can be attached symbolically illustrated there that can act as ignition sources during operation, e.g. due to heat production, spark creation, radiation or other influences. The housing 10 separates these ignition sources 12, 13 from the environment 14 in order to block a propagation of flames or explosions that occur in the interior 11 into the environment 12. The housing 10 is preferably a housing in the protection category "flameproof enclosure" (ex-d). However, to allow a quick pressure compensation, particularly in the event of an explosion occurring in the interior 11, and thus a quick reduction of the overpressure that was created in the housing 10, a pressure relief device 15 is provided that is illustrated in FIG. 1 only by way of example being mounted on the side of the housing 10. However, the pressure relief device 15 can also be arranged on any other surface of the housing 10. Also the housing 10 can comprise multiple of such pressure relief devices 15 of equal or different size.

In the example the pressure relief device 15 is effective between the interior 11 and the environment 14. It is, however, also possible to arrange the pressure relief device 15 between the interior 11 and a pressure relief volume closed to the outside that is separated from the environment 14 temporarily or permanently. The pressure relief volume can in turn be provided with a pressure relief device.

Figures 2, 3:
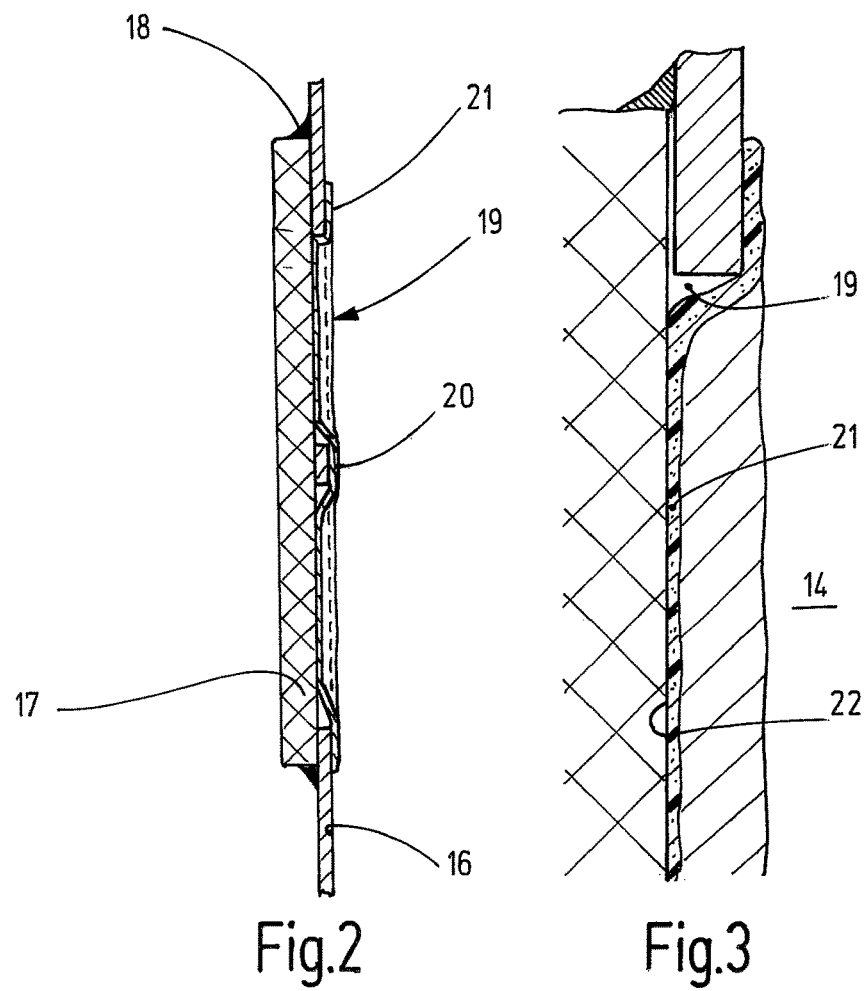

The configuration of the pressure relief device is apparent from FIGS. 2 and 3 in more detail. According to that the wall of the housing forms a component 16 on which a pressure relief body 17 is directly or indirectly attached. In the present embodiment the pressure relief body 17 is welded to the component 16 in that a ring-shaped weld seam 18 is provided between the component 16 and the porous body 17 that extends around its circumference. However, in the context of the invention all other possibilities for connection of the housing wall forming the component 16 and the pressure relief body 17 can be considered. For example, the pressure relief body 17 can be arranged in a socket that in turn is connected with the component 16, e.g. attached thereon by screwing, welding, gluing or in another manner. Also the pressure relief body 17 can be embedded with its edge in the component 16, i.e. in the housing wall, if the housing 10 is manufactured by a casting technique or in another primary shaping method, e.g. additive manufacturing technique.

In the present embodiment the pressure relief body 17 is attached to a pressure relief opening 19 via which the interior 11 is connected with the environment 14. This pressure relief opening 19 can have any suitable shape, e.g. a rectangular or square shape with sharp or rounded edges, an oval shape, a circular shape or any other suitable form. Also the porous body 17 itself can cover the whole assigned wall surface of the housing 10, i.e. can form the wall on its own or can extend over multiple walls.

In the embodiment the pressure relief opening is divided in multiple part openings by a grid 20, as illustrated in dashed lines in FIG. 1. The grid 20 can serve for separating the gas flow passing through the porous body 17 in multiple part flows and thus to make the flow uniform as well as to the support of the porous body 17. In other embodiments the grid 20 can be omitted.

The porous body 17 can be any gas-permeable pressure relief body having a flame-extinguishing effect, as for example an open porous metal foam, a metal sinter body, a body sintered from metal wires, wherein the wires can be disorderly arranged similar to a non-woven fabric or felt or can be arranged in stacks of woven fabric or knitted fabric on top of each other. Also the porous body 17 can be formed by a ceramic body, a metallized ceramic body, a body sintered from ceramic fibers or other ceramic particles or a body bound with organic binding agents or the like.

The body 17 serving for pressure relief is provided with a membrane 21 that is preferably configured in a moisture-impermeable manner, as apparent from FIGS. 2 and 3, that covers the body 17 on its side 22 facing the environment 14 (see FIG. 3), preferably completely two-dimensionally. The membrane 21 can extend beyond the component 16 with its edge and extend over it with an edge surrounding the pressure relief opening 19. In doing so, the membrane 21 seals the pressure relief opening 19, particularly against moisture entry.

The membrane is preferably created by primary shaping on the housing 10 and thus the pressure relief device 15. The body 17 and, if applicable, the component supporting it thus form a basis, in a sense a die, on which the membrane 21 is formed and is thus primary shaped. In the simplest case the membrane 21 is created by application of a precursor composition on the pressure relief body 17 and the edge of the pressure relief opening 19, e.g. by spraying on or printing on, rolling on, painting on or similar methods. Thereby, depending on the process control, the membrane 21 can be created with substantially constant layer thickness or also with changing layer thicknesses. The material is applied on the side of the porous body 17, on which in the event of a required pressure reduction, the lower pressure is present.

The shapeless pulpy or liquid precursor composition can be a partly linked or unlinked elastomer or polymer or the like, as it is for example commercially available as sprayable "liquid rubber". Also any other particularly sprayable foil can be applied as far as it forms a detachable film on the porous body 17.

Figure 6:
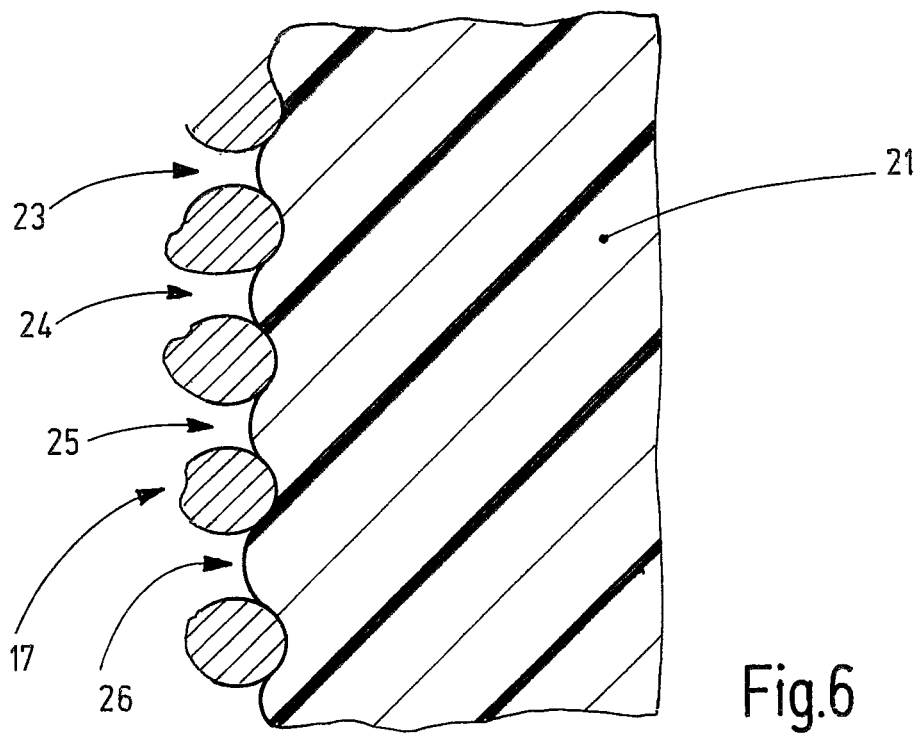

The housing 10 with the inventive pressure relief device 15 operates as follows:

During the provision of the housing 10 the membrane 21 has been sprayed on the pressure relief opening 19 and the body 17 arranged thereon from outside in a manner covering the opening edge, such that the pressure relief opening 19 is closed outwardly by the created membrane 21. In doing so, pollution and, if applicable, clogging of pores of the body 17 along with entrance of dust or moisture in the body 17 is impeded. Reference is made to FIG. 6 that shows the body 17 with its side facing the membrane 21. The material of the membrane 21 covers the pores 23, 24, 25, 26 without deeply penetrating therein. The membrane 21 thereby sticks on the porous body 17 at least so strong that an unintentional release of the membrane 21 from the porous body 17 and the housing 10 is precluded.

If the housing 10 has received an explosive gas mixture, e.g. through present gaps or other openings and if this is ignited or if one of the components 12, 13 explodes or burns, an overpressure develops in the interior 11 compared with the environment 14 that results in a pressure difference on the pressure relief body 17. Based thereon, the membrane 21 is detached from the body 17 such that the membrane 21 can detach, swell away therefrom and can rupture thereby. Thus, the now destroyed membrane 21 releases a path for gas flowing out of the interior 11. The body 17 avoids, however, due to the length and narrowness of the pores 23-26 an escape of flames to the outside.

After such an incident the membrane 21 has to be replaced. In the simplest case this happens by once again spraying membrane material, e.g. liquid rubber, on the pressure relief opening 19 and the porous body 17 placed underneath.

Figure 7:
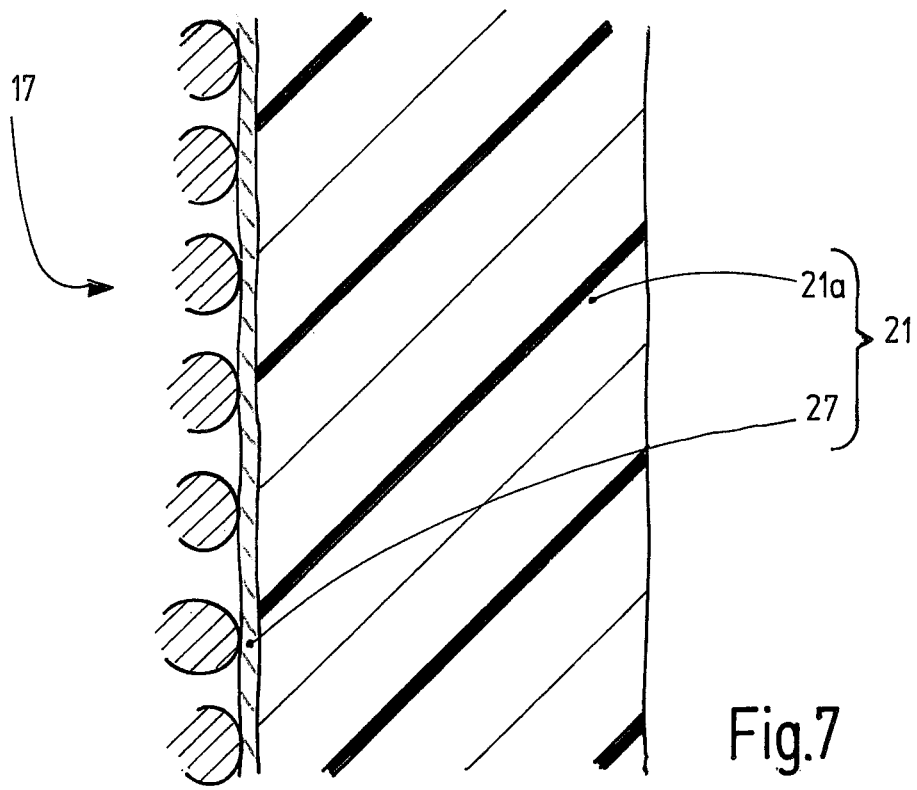

Numerous modifications can be made to the invention described so far. A first modification is illustrated in FIG. 7 having a membrane 21 configured in multiple layers. A foil 27 and a layer 21a sprayed thereon and cured subsequently and consisting of liquid rubber, for example, is part thereof. The foil 27 abuts with low adhesion and, if applicable, very low adhesion against the porous body 17 and covers it partly or completely in two-dimensional manner. The layer 21a sprayed thereon can adhere to the foil 27 or can also only loosely abut against it. The layer 21a can have a uniform thickness or different thicknesses. Particularly it can be configured thinner in the center area of the foil 27 or can be omitted completely in sections, particularly in the center area.

This configuration is particularly suitable for applications in which the membrane 21 has to release the flow path through the pressure relief body 17 in the event of very low pressure differences.

In another modification of this embodiment the layer 21a can also be limited to a periphery of the foil 27, such that the layer 21 creates a moisture-tight connection between the foil 27 and the component 16.

Figure 4:
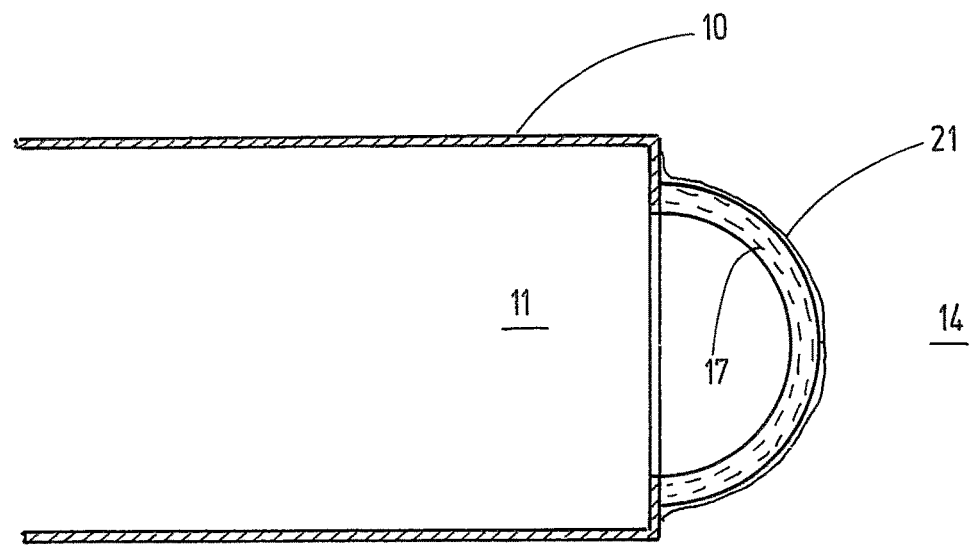

FIG. 4 illustrates an embodiment with a three-dimensionally shaped body 17 serving for pressure relief that is only by way of example illustrated as hemispherical dome. However, also cylinder shapes with flat or rounded edges, polyhedron shapes, cone or truncated cone shapes or the like are possible. The outer side of the body 17 facing the environment 14 is again provided with a membrane 21 sprayed thereon that forms a detachable foil. Apart therefrom, the above description of the embodiments according to FIGS. 1-3 and FIGS. 6 and 7 applies accordingly.

Figure 5:
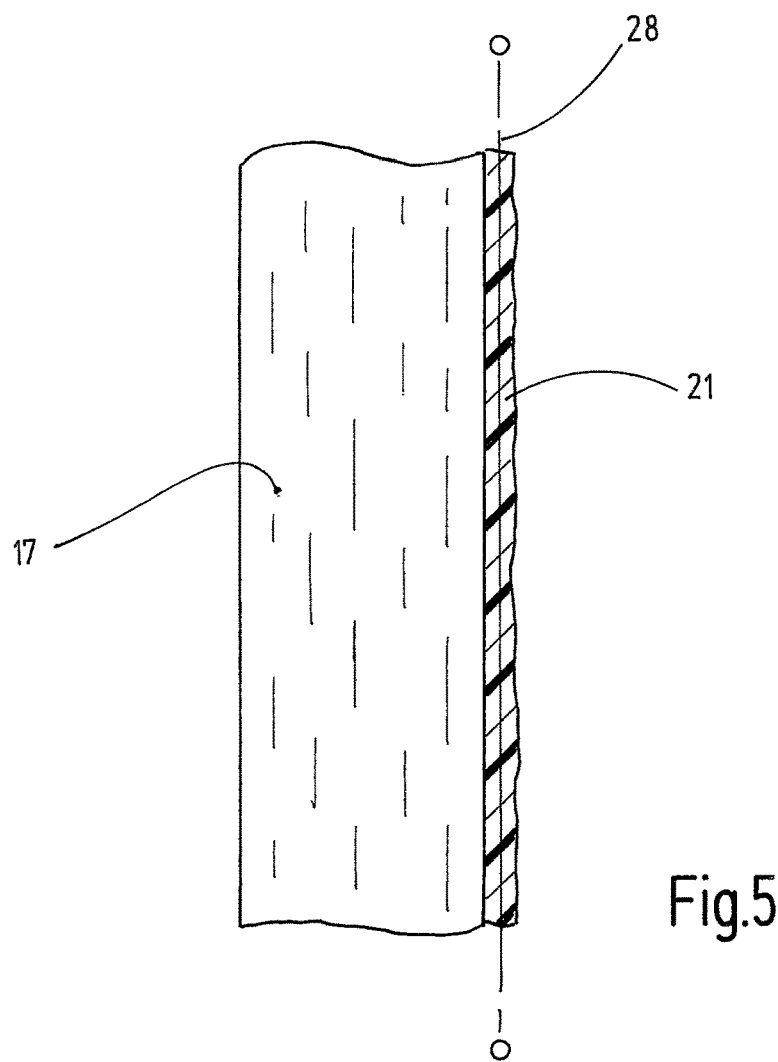

FIG. 5 illustrates another modification that can be applied to all mentioned embodiments. There a membrane 21 is sprayed on the porous body 17 that comprises another functional element 28. Such a functional element 28 can be a conductor path, as illustrated, that is applied on the membrane 21 or embedded therein. For example, a conductor strip formed from conductive varnish, a metal foil strip or the like can serve as conductor path. If the membrane 21 is detached from the pressure relief body 17 and if the membrane 21 rips, it can be detected by the functional element 28. For example, a respective conductor path can be interrupted and this can be detected and transmitted by a monitoring circuit.

Functional elements can also be integrated in the membrane configuration according to FIG. 7. For example, the foil 27 can support a functional element, e.g. electronic components, conductor paths, electronic circuits and the like that can then be covered by the layer 21a.

It is indicated that the membrane 21 can also be provided as a whole in form of a cut of a pre-manufactured foil that is flexible and is attached abutting against the body 17 on the pressure relief device 15. For this the foil can be coated on one side with an adhesive that provides an adhesion to the porous body 17. As an alternative, the foil can be configured in a self-adhesive manner. The foil can be configured as a thermally deformable foil, e.g. as shrink foil or as foil that softens and gets in abutment with the body 17 in order to stick thereto during heating.

The pressure relief device 15, according to the invention, comprises a gas-permeable body 17 to which a membrane adheres, but is preferably impermeable to moisture. The membrane 21 can be a rubber membrane having a single or multiple layers that is formed, for example, by applying liquid rubber on the pressure relief body 17 and, if applicable, on a component 16 supporting the liquid rubber and surrounding the pressure relief body 17.

REFERENCE SIGNS 10 housing
11 interior
12, 13 components
14 environment
15 pressure relief device
16 component
17 porous body/pressure relief body
18 weld seam
19 pressure relief opening
20 grid
21, 21a membrane
22 side of body 17 facing the environment
23-26 pores
27 foil
28 functional element

The invention claimed is:

1. A pressure relief device configured for use with explosion-protected housings, the pressure relief device, comprising:
a porous gas-permeable body having a first side facing in a first direction and a second side facing in a second direction, the second direction being away from the first direction; and
a membrane attached to the porous gas-permeable body in a manner being in abutment against the porous gas-permeable body, wherein the membrane comprises a separate first layer comprising a foil that abuts against the porous gas-permeable body and a separate second layer applied to the foil such that the foil is located between the second layer and the porous gas-permeable body.

2. The pressure relief device according to claim 1, wherein the membrane is attached to the porous gas-permeable body in complete two-dimensional abutment.

3. The pressure relief device according to claim 1, wherein the second layer is a liquid rubber applied to the foil.

4. The pressure relief device according to claim 1, wherein the membrane is moisture-impermeable.

5. The pressure relief device according to claim 1, wherein the membrane is attached to the porous gas-permeable body in a detachable manner by an adhesive.

6. The pressure relief device according to claim 1, wherein the foil is selected from the group comprising; a piece of paper, a plastic foil, a metal foil, a composite material foil, a plastic/metal composite foil, a woven fabric or another flexible two-dimensional structure.

7. The pressure relief device according to claim 1, wherein the porous gas-permeable body is a planar pressure relief body.

8. The pressure relief device according to claim 1, wherein the porous gas-permeable body has a non-planar second side.

9. An explosion-protected housing, comprising:
a housing wall defining an interior;
at least one pressure relief opening in the housing wall in fluid communication with the interior;
a pressure relief device sealing the at least one pressure relief opening, the pressure relief device, comprising:
a porous gas-permeable body having a first side facing the interior in a first direction and a second side facing away from the interior in a second direction; and
a membrane attached to the porous gas-permeable body in a manner being in abutment against the porous gas-permeable body, wherein the membrane comprises a separate first layer comprising a foil that abuts against the porous gas-permeable body and a separate second layer applied to the foil such that the foil is located between the second layer and the porous gas-permeable body.

10. A method for attaching a membrane to a porous gas-permeable body in order to provide a pressure relief device, comprising:
providing a porous gas-permeable body, the porous gas-permeable body having a first side facing in a first direction and a second side facing in a second direction, the second direction being away from the first direction;
applying a foil layer to the second side of the porous gas-permeable body;
spraying of a non-cured membrane material on the foil layer after it has been applied to the second side of the porous gas-permeable body; and
curing the non-cured membrane material.

11. The method according to claim 10, wherein the non-cured membrane material is also sprayed onto a portion of a housing supporting the porous gas-permeable body.

12. The pressure relief device according to claim 2, wherein the second layer is a liquid rubber applied to the foil.

13. The pressure relief device according to claim 12, wherein the membrane is moisture-impermeable.

14. The pressure relief device according to claim 13, wherein the membrane is attached to the porous gas-permeable body in a detachable manner by an adhesive.

15. The pressure relief device according to claim 14, wherein the foil is selected from the group comprising; a piece of paper, a plastic foil, a metal foil, a composite material foil, a plastic/metal composite foil, a woven fabric or another flexible two-dimensional structure.

16. The explosion proof housing as in claim 9, wherein the membrane extends in sections over the housing wall and the housing wall supporting the porous gas-permeable body.

17. The explosion proof housing as in claim 9, wherein the at least one pressure relief opening is a plurality of openings defined by a grid and the membrane extends over the grid, the porous gas-permeable body being secured to the grid.

18. The explosion proof housing as in claim 9, wherein the separate second layer has a uniform or non-uniform thickness or different thicknesses.

19. The pressure relief device as in claim 1, wherein the separate second layer has a uniform or non-uniform thickness or different thicknesses.

* * * * *